J. K. PIERCE.
CLUTCH MECHANISM.
APPLICATION FILED MAY 13, 1921.
1,426,213.
Patented Aug. 15, 1922.
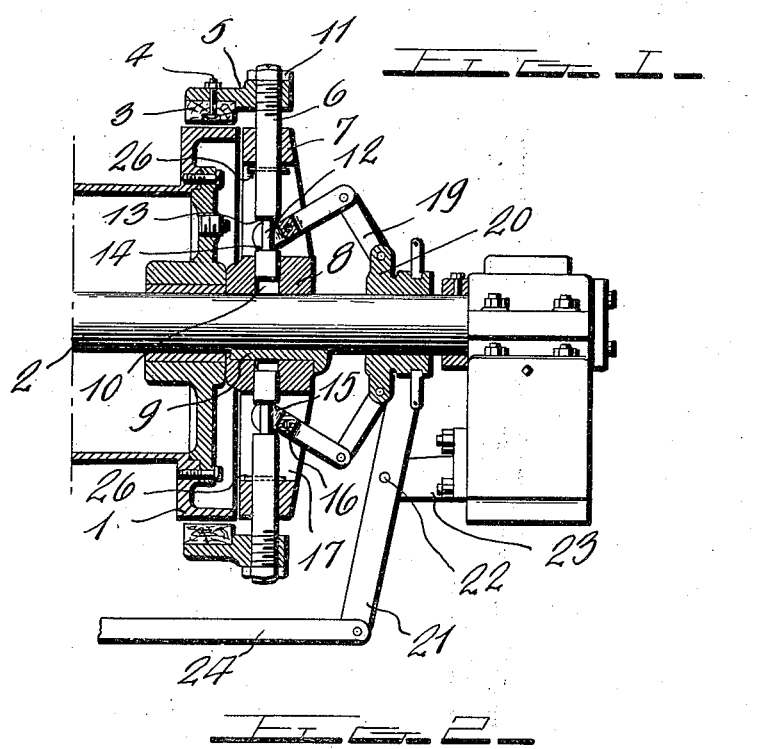
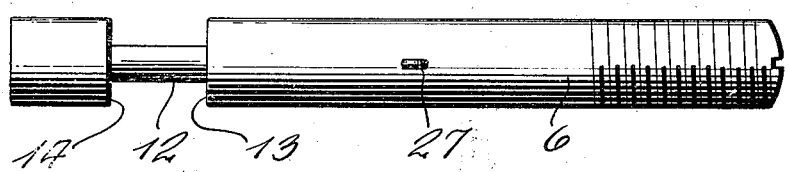
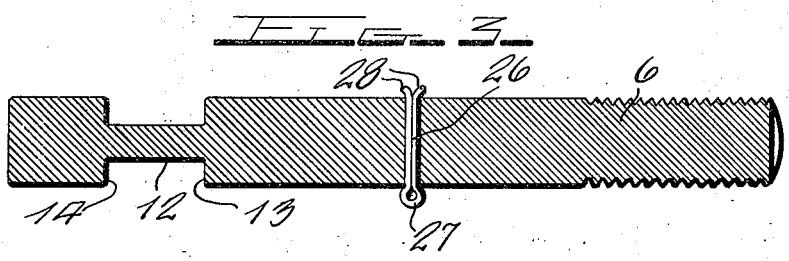
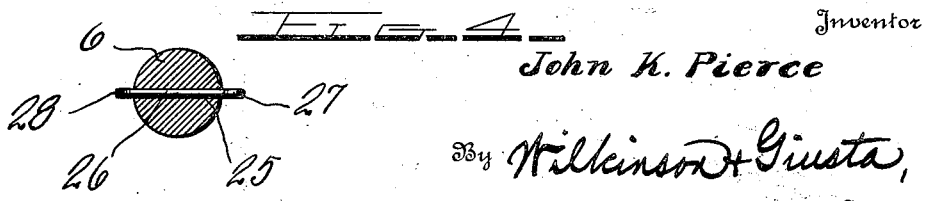
Inventor
John K. Pierce
By Wilkinson & Giusta,
Attorneys

UNITED STATES PATENT OFFICE.

JOHN K. PIERCE, OF FORT WORTH, TEXAS.

CLUTCH MECHANISM.

1,426,213.　　　　　　Specification of Letters Patent.　　Patented Aug. 15, 1922.

Application filed May 13, 1921. Serial No. 469,242.

*To all whom it may concern:*

Be it known that I, JOHN K. PIERCE, a citizen of the United States, residing at Fort Worth, in the county of Tarrant and State of Texas, have invented certain new and useful Improvements in Clutch Mechanism; and I do hereby declare the following to be a full, clear, and exact description of the invention, such as will enable others skilled in the art to which it appertains to make and use the same.

The present invention relates to improvements in clutch mechanism and more particularly refers to that type of clutch mechanism in which radially reciprocating rods carry clutch shoes cooperating with the external surface of a rotatable drum, such rods being mounted in a clutch wheel and having portions near their inner ends reduced for engagement with complementary parts of an actuating mechanism.

In the actual use and operation of clutch mechanisms of the above character, great danger and financial loss is incurred and sustained by reason of frequent breakages occurring in the rods that carry the brake shoes at the reduced inner portions thereof occupied by the actuating device. This reducing of the rods weakens the same and the rods are apt to crystallize or become broken from other causes incident to the high velocity of their rotation and other hard usages. When breakage occurs the rods and shoes are thrown outwardly by centrifugal force and are a constant menace to employees, besides also being the fruitful cause of great property damage, and moreover the shoes and rods themselves become broken by impact with surrounding objects, being thus a further loss.

It is the object of the present invention to avoid the above difficulties and to remove the menace to life and property by equipping the rods with stops independent of the actuating mechanism and located outwardly on the rods with respect to the reduced and weakened portions thereof, which stops will cooperate with the clutch wheel by which the rods are carried and will restrain the latter against any tendency to leave the wheel: and moreover the improved stop mechanism will limit the outward movement of the shoes from the drum and will eliminate a large percentage of the noise incident to the vibrating of loose parts and will further insure the shoes being held constantly away from the drum until such time as the clutch is to be engaged.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a vertical sectional view, with parts shown in elevation, of the clutch mechanism with the improved stop device thereon;

Fig. 2 is a plan view of one of the clutch rods with a stop device thereon;

Fig. 3 is a sectional view taken longitudinally and at right angles to Fig. 2 and shows the improved stop device; and Fig. 4 is a transverse sectional view taken through the rod and showing the stop pin in place.

Referring more particularly to the drawings, in Fig. 1 I have illustrated a type of clutch mechanism to which the invention is applied and which involves a drum 1 mounted loosely upon a shaft 2 and having clutch shoes 3 adapted to engage the outer surface thereof. The shoes 3 are secured as by bolts 4, or in any other fixed or removable manner, to carriers 5 adjustably mounted upon the outer screw threaded ends of rods 6, which are fitted to reciprocate through radial openings made in the rim 7 of the clutch wheel.

The hub 8 of the clutch wheel is secured as by a spline 9 to the shaft 2 at one side of the drum 1. Radial sockets 10 in the hub 8 slidably receive and guide the inner ends of the rods 6. The outer screw threaded ends of the rods 6 project beyond the rim 7 of the clutch wheel and receive nuts 11 by which the carriers 5 are adjustably secured to said rods.

The rods are formed with reduced necks 12 near their inner ends having shoulders 13 and 14 at the ends of the necks for engagement by the bifurcated parts of toggle arms 15 pivoted at 16 within radial slots 17 of the clutch wheel. The toggle arms 15, together with companion links 19 form toggle levers which are in engagement with the slidable collar 20 on the shaft 2. This collar 20 is moved backward and forward by a lever 21 fulcrumed as represented at 22 to the bracket or appropriate support 23. The link 24 is connected to the lever 21 and is useful in oscillating the lever either automatically or normally from a remote point.

The operation of this clutch mechanism is as follows:

The lever 21 is moved in one or the other direction and through the toggle arrangement 15, 19 the actuating levers 15 are swung upon their pivots 16 to thereby shift the rods 6 either in or out. The clutch shoes 3 are shifted to correspond and consequently they are either moved into direct engagement with the drum 1 or are removed from contact therewith as illustrated in Fig. 1.

Now the rods 6 frequently become broken at the weakened necks 12 and, there being no other restraint upon such rods, together with the carriers 5 and clutch shoes 3, they are thrown outwardly by the centrifugal force incident to the rotation of the clutch wheel. It is this menace that the invention is intended to overcome. I propose to accomplish this result by boring or otherwise producing in the rods 6 at appropriate points transverse openings 25 and to insert in the openings 25 so made, stop pins 26, which may be in the nature of cotter pins as illustrated. These pins 26 are so placed that their projecting heads 27 and overturned ends 28 will lie outside of the cylindrical surface of the rods 6 and are so positioned and located on the rods that such projecting parts will come into engagement with the interior surface of the rim 7 of the clutch wheel and avoid the further radial movement of the rods. In Fig. 1, I show the clutch shoe out of engagement with the drum and the stop pins in contact with the rim 7, so that there is a definite relation between the position of the stop pins on rods 6 and the outer free positions of the clutch shoes 3. Heretofore the clutch shoes 3 and rods 6 were only restrained by the actuating mechanism in connection with the reduced necks 12; but the various pivotal joints and contact surfaces of the actuating mechanism parts would become loose from wear in the course of time, so that rattling and vibration would occur in the rods and brake shoes. This condition gave rise to undesirable noise and also at times allowed the brake shoes in their vibrating movement to come in contact with the drum 1 which of course is not desired until the mechanism is positively actuated to this end.

With the stop pins 26, all weight of the rods and brake shoes is taken off the actuating mechanism and the weakened necks 12 so that in effect the entire weight of the rods, carriers 5 and shoes 3 devolves upon the stop pins 26 when the clutch is disengaged and this avoids or at least lessens the likelihood of breakage in the necks 12, which heretofore assumed a great part of this weight. Moreover, if breakage actually occurs in the necks 12 or other parts of the mechanism, the stops 26 will still hold the rods and shoes in place and will thus avoid any injury to these parts or to either property or persons they might strike if left unrestrained. The pins 26 are easily removable so as to permit withdrawal of the rods from the clutch wheel whenever desired.

Frequently the pivots 16 or the toggle arms will also break and free the pins and disastrous consequences follow which will be avoided by the use of the present invention.

It is obvious that various changes and modifications may be made in the details of construction and design of the above specifically described embodiment of this invention without departing from the spirit thereof, such changes and modifications being restricted only by the scope of the following claims.

What is claimed is:

1. In a clutch mechanism in which external clutch shoes are adapted to bind upon the outside surface of a rotary friction drum, and in which the shoes are carried upon the outer ends of reciprocating rods carried in a rapidly rotating clutch wheel, with means to shift the rods in and out accordingly as the clutch is to be engaged or disengaged, of means carried by the rods at portions thereof within the clutch wheel and extending transversely through the rods with end portions of said means adapted to project outwardly beyond the surface of the rods and to lie in the path of inner portions of the clutch wheel whereby to encounter such inner portions of the clutch wheel to avoid the rods becoming disengaged therefrom on breakage of the means for reciprocating the rods or the rod's connection with such means, substantially as described.

2. A safety appliance for use in conjunction with clutch mechanism in which reciprocating rods which are carried by a rapidly rotating clutch wheel are slidable through the rim thereof and carry external clutch shoes adapted to frictionally clamp against the outside surface of a rotary friction drum, the rods having inner reduced or weakened portions engaged with an adjusting means for shifting the same in and out, said safety appliance comprising pins projecting transversely through the rods interiorly of the rim of the clutch wheel and having ends of the pins projecting beyond the sides of the rods for striking the inner faces of the rim to avoid the disengagement of the rods from the clutch wheel on breakage of the reduced or weakened parts of the rods, said pins being located on the rods remote from the weakened or reduced portions thereof, but inwardly of portions of the rod which must slide through the rim of the clutch wheel in the ordinary engagement and disengagement of the clutch shoes from the rotary drum, substantially as described.

JOHN K. PIERCE.